(12) United States Patent
Viji et al.

(10) Patent No.: US 7,631,267 B2
(45) Date of Patent: Dec. 8, 2009

(54) AUXILIARY DISPLAY SIDEBAR INTEGRATION

(75) Inventors: Sriram Viji, Seattle, WA (US); Paula L. Tomlinson, Redmond, WA (US); Brian C. Teutsch, Seattle, WA (US); Daniel J. Polivy, Seattle, WA (US); Matthew P. Rhoten, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/446,493

(22) Filed: Jun. 1, 2006

(65) Prior Publication Data

US 2007/0198946 A1 Aug. 23, 2007

Related U.S. Application Data

(60) Provisional application No. 60/774,912, filed on Feb. 17, 2006.

(51) Int. Cl.
G06F 3/00 (2006.01)
G06F 9/00 (2006.01)
G06F 17/00 (2006.01)

(52) U.S. Cl. .................. 715/763; 715/748; 715/749

(58) Field of Classification Search ........... 715/760, 715/762, 763, 764, 779, 748, 749; 345/1.1, 345/1.3, 1.2
See application file for complete search history.

(56) References Cited

U.S. PATENT DOCUMENTS 6,144,960 A * 11/2000 Okada et al. ............... 707/10
6,404,623 B1 6/2002 Koshika
6,859,219 B1 2/2005 Sall
6,919,864 B1 * 7/2005 Macor ...................... 345/1.1
7,159,186 B2 * 1/2007 Mattila et al. ............. 715/769
2002/0140627 A1 * 10/2002 Ohki et al. ................. 345/1.1
2003/0006942 A1 * 1/2003 Searls et al. ............... 345/1.1
2003/0222913 A1 * 12/2003 Mattila et al. .............. 345/764
2004/0127284 A1 * 7/2004 Walker et al. ............... 463/30
2004/0192434 A1 * 9/2004 Walker et al. ............... 463/25
2004/0212640 A1 * 10/2004 Mann et al. ................ 345/792
2004/0218036 A1 11/2004 Boss (Continued)

FOREIGN PATENT DOCUMENTS

WO  WO2005029312 A1  3/2005

OTHER PUBLICATIONS

Next Generation PC Platform Built on Intel(R) Centrino TM Mobile Technology New Usage Models ftp://download.intel.com/technology/itj/2005/volume09issue01/art07_next_generation/vol09_art07.pdf Feb. 17, 2005.
FlipStart PC http://www.handtops.com/show/news/5 Feb. 26, 2004.

*Primary Examiner*—Tadesse Hailu
*Assistant Examiner*—Anita D Chaudhuri
(74) *Attorney, Agent, or Firm*—Workman Nydegger

(57) ABSTRACT

Described is a technology by which an application program such as a gadget may communicate with a sidebar program to output content for consumption by an auxiliary display device. The gadget may communicate with the sidebar program via sidebar APIs, and in turn the sidebar program communicates with an auxiliary display device platform via auxiliary display device APIs. Among its capabilities, the sidebar program may install gadgets on a host computer system, and upon detecting that the host computer system is configured to operate with an auxiliary display device, may install the gadget such that the gadget is configured to work with an auxiliary display device. The installation may be accomplished by having the sidebar program write information to a system registry.

20 Claims, 7 Drawing Sheets

U.S. PATENT DOCUMENTS

| | | | |
|---|---|---|---|
| 2004/0225901 A1* | 11/2004 | Bear et al. | 713/300 |
| 2005/0050462 A1 | 3/2005 | Whittle | |
| 2005/0091302 A1* | 4/2005 | Soin et al. | 709/200 |
| 2005/0091359 A1* | 4/2005 | Soin et al. | 709/223 |
| 2005/0198584 A1 | 9/2005 | Matthews | |
| 2005/0243019 A1 | 11/2005 | Fuller | |
| 2005/0243020 A1* | 11/2005 | Steeb et al. | 345/1.3 |
| 2005/0243021 A1 | 11/2005 | Perez | |
| 2005/0259032 A1 | 11/2005 | Morris | |
| 2006/0007051 A1 | 1/2006 | Bear | |

* cited by examiner

550

AUXILIARY DISPLAY SIDEBAR INTEGRATION

CROSS REFERENCE TO RELATED APPLICATION

The present invention claims priority to U.S. provisional patent application Ser. No. 60/774,912, filed Feb. 17, 2006, which is hereby incorporated by reference.

BACKGROUND

In contemporary computer systems, "gadgets" generally refer to relatively small, lightweight application programs that provide a wide variety of possible uses. For example, gadgets can connect to web services to deliver weather information, news updates, traffic maps, Internet radio streams, and slide shows of online photo albums. Gadgets can also integrate with existing application programs to streamline a user's interaction with them. For example, a gadget can give an at-a-glance view of a user's online instant messaging contacts, the day view from a calendar, and/or an easy way to control a media player. Gadgets can also have any number of dedicated purposes, e.g., to access calculators, games, sticky notes, and so forth.

At the same time, users of contemporary computer systems are able to view and generally interact with selected content on a small auxiliary display device coupled to or integrated into a main host computer system. To this end, an auxiliary display screen, along with an operating system-provided platform (referred to as an auxiliary display platform, or a Windows® SideShow™ platform), enables developers and authors to present content to users. This allows the user to view the content on the auxiliary display device even when the main host computer system is in a reduced power state (e.g., ACPI S3 sleep state), or even turned off.

The use of gadgets in conjunction with an auxiliary display device (or other devices) when available would provide computer users with numerous benefits.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards receiving a request to install a gadget on a host computer system, detecting that the host computer system is configured to operate with an auxiliary display device, and installing the gadget such that the gadget is configured to output data for display on the auxiliary display device when the auxiliary display is coupled to the host computer system. For example, the gadget may be installed from an application program, from downloadable content, by user selection of a file corresponding to the gadget, and so forth. Installing the gadget may be accomplished by writing information to a system registry, such as via a sidebar program that installs the gadget.

An application such as a gadget may communicate with the sidebar program via a first interface set, and the sidebar program may communicate with an auxiliary display device platform via a second interface set. In this manner, for example, the application program may output content for consumption by an auxiliary display device, such as by calling one or more methods of the first interface set that causes the sidebar program to call one or more methods of the second interface set. Thus, by executing the sidebar program and communicating with it via a first interface set, and providing data to the auxiliary display device platform via a second interface set, the application program can output information to the auxiliary display device.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
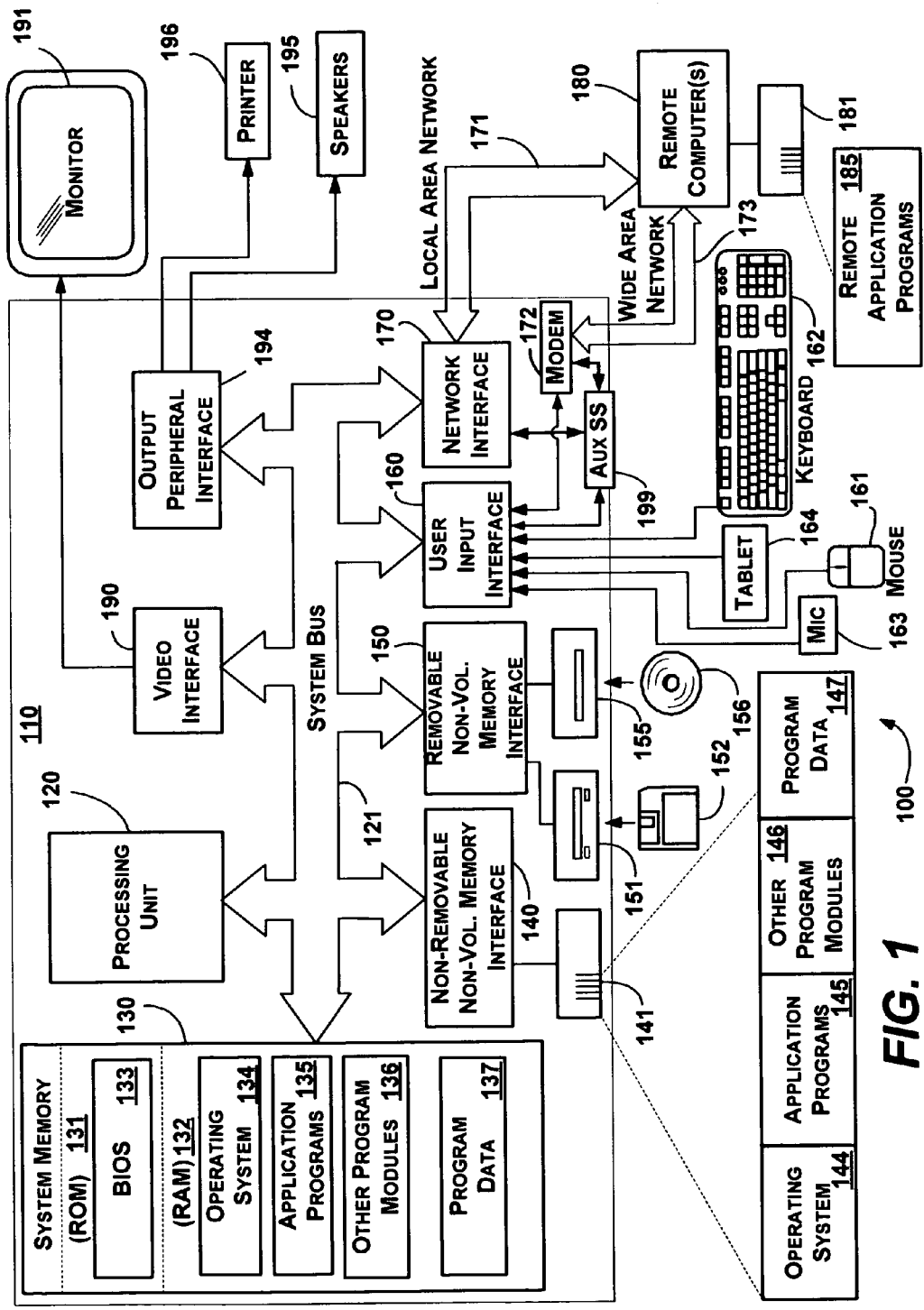
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

Auxiliary Display and Sidebar Integration

Figure 2:
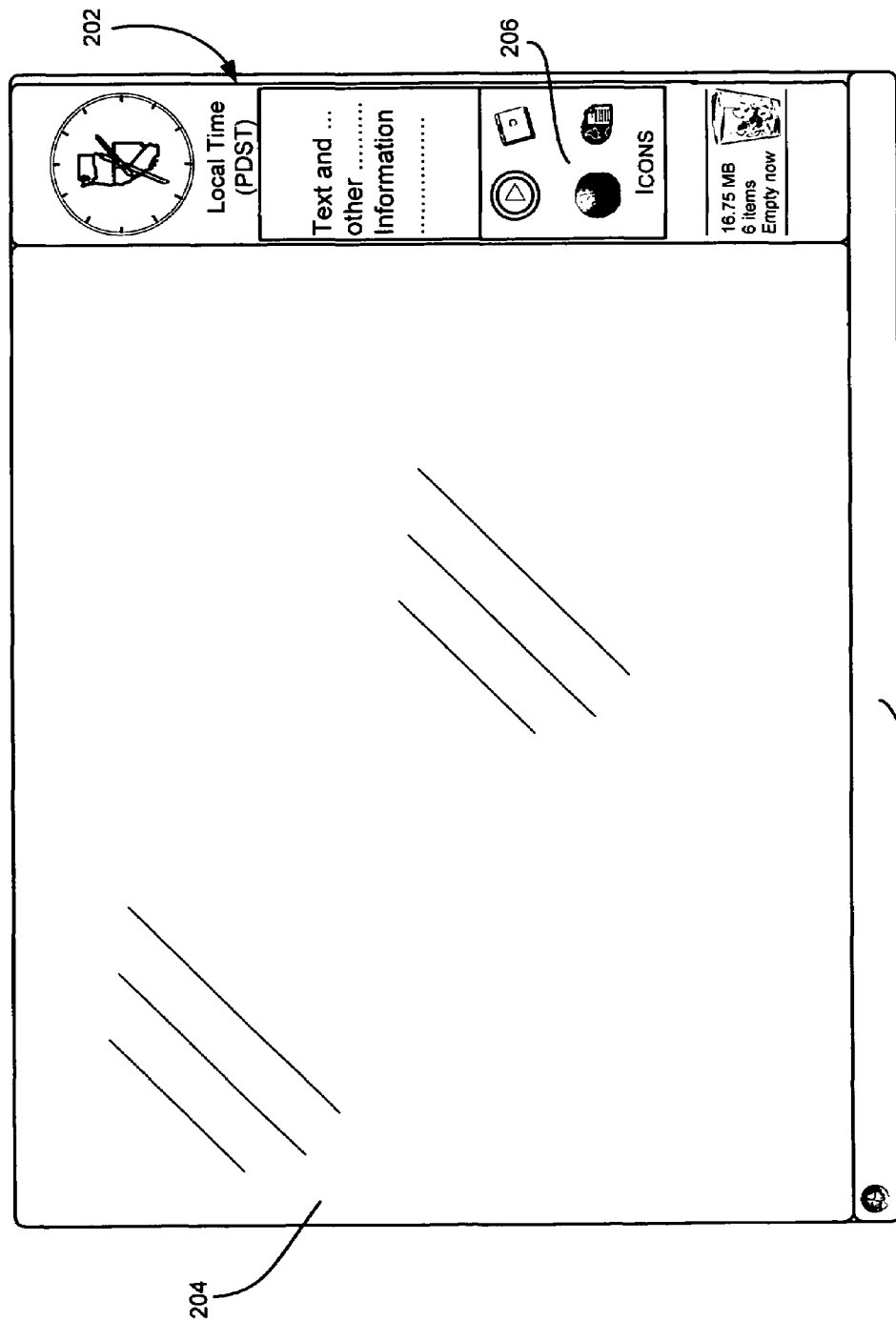
FIG. 2 is a representation of a sidebar program's user interface area on a desktop of a host computer system.

Various aspects of the technology described herein are directed towards a technology by which a user is able to use a convenient user interface mechanism to organize and select programs for operating in conjunction with an auxiliary display device. In one example implementation described herein, the user interface mechanism comprises Windows® Sidebar (or simply sidebar), which as generally represented in FIG. 2, typically appears as a pane 202 on the side of (or above or below) a Windows® Vista™-based operating system's (or comparable operating system's) main desktop area 204. Note that one or more application programs may have their program windows in the main desktop area 204.

In general, the sidebar pane 202 has been designed to help users quickly interact with computer systems, including by providing easy user access to gadgets, which as mentioned above, comprise specialized, lightweight mini-applications, typically providing a wide variety of easy-to-use and customizable mini-applications that offer information at a glance and provide easy access to frequently used tools. Among other things, the sidebar pane 202 organizes gadgets and makes them easy to access, such as via icons 206. For example, gadgets (e.g., via the icons 206 representing them) can be moved on and off the sidebar 202.

In FIG. 2, the exemplary sidebar 202 is positioned to the right of the desktop 204 or other program, with a separate taskbar 208 (e.g., including a start button and possibly a system tray) shown below the desktop 204 for completeness. Notwithstanding the example location shown in FIG. 2, the sidebar 202 is user-customizable for user interaction, e.g., it may be set to be always on top relative to other windows, and/or positioned on a side, or above or below maximized windows. The sidebar supports a number of user configuration options, including remaining behind other windows and being hidden completely.

A contemporary operating system such as Windows® Vista™ also may be designed with an auxiliary display platform so as to work with one or more auxiliary display devices. Auxiliary display devices typically comprise small display screens, whether integrated into a computer's (e.g., laptop) housing, or provided as an add-on device coupled to the computer via some communications link. As will be understood, however, the technology described herein is not limited to any particular concepts or the examples used herein. For example, the technology described herein is not limited to any particular types of auxiliary display devices, but rather includes devices not conventionally thought of as "computer-system" coupled devices, such as a television set, an audio receiver, an audio/video recorder, a telephone, a separate computer, a mobile communications device, a secondary display screen with actuators, a watch, a wall (e.g., kitchen) display, a display screen, a digital picture frame, a clock, a radio, a media player, a device embedded within or using the main display of a consumer electronics device, automotive, transportation or other vehicular units, keyboards or other input devices of the main computer system, a pager, a personal digital assistant, and so forth. As such, the present invention is not limited to the examples, structures or functionality described herein; rather, any of the examples, structures or functionalities described herein are non-limiting, and the present invention may be used various ways that provide benefits and advantages in computing, data communication, programs, and content handling in general.

To integrate the concept of an auxiliary display device with the concept of a sidebar, example aspects of the technology described herein are generally directed towards the integration between an auxiliary display (e.g., Windows® Side-Show™) platform and a sidebar platform, as well as towards other considerations. Such other considerations include developer integration in terms of gadget install technologies and API surface, as well as to future integration between the two platforms, such as reusing gadgets in multiple locations.

In general, gadgets reside on a user's computer. A gadget may be downloaded from a website or received via email, and an application program may install a gadget. When a user encounters a gadget (e.g., a file having a ".gadget" extension), the user is able to double-click to "install" the gadget, a process that may inform the user about any risks associated with gadgets and extracts the files for use by the sidebar. The gadget file remains for the user to archive or delete.

Figure 3:
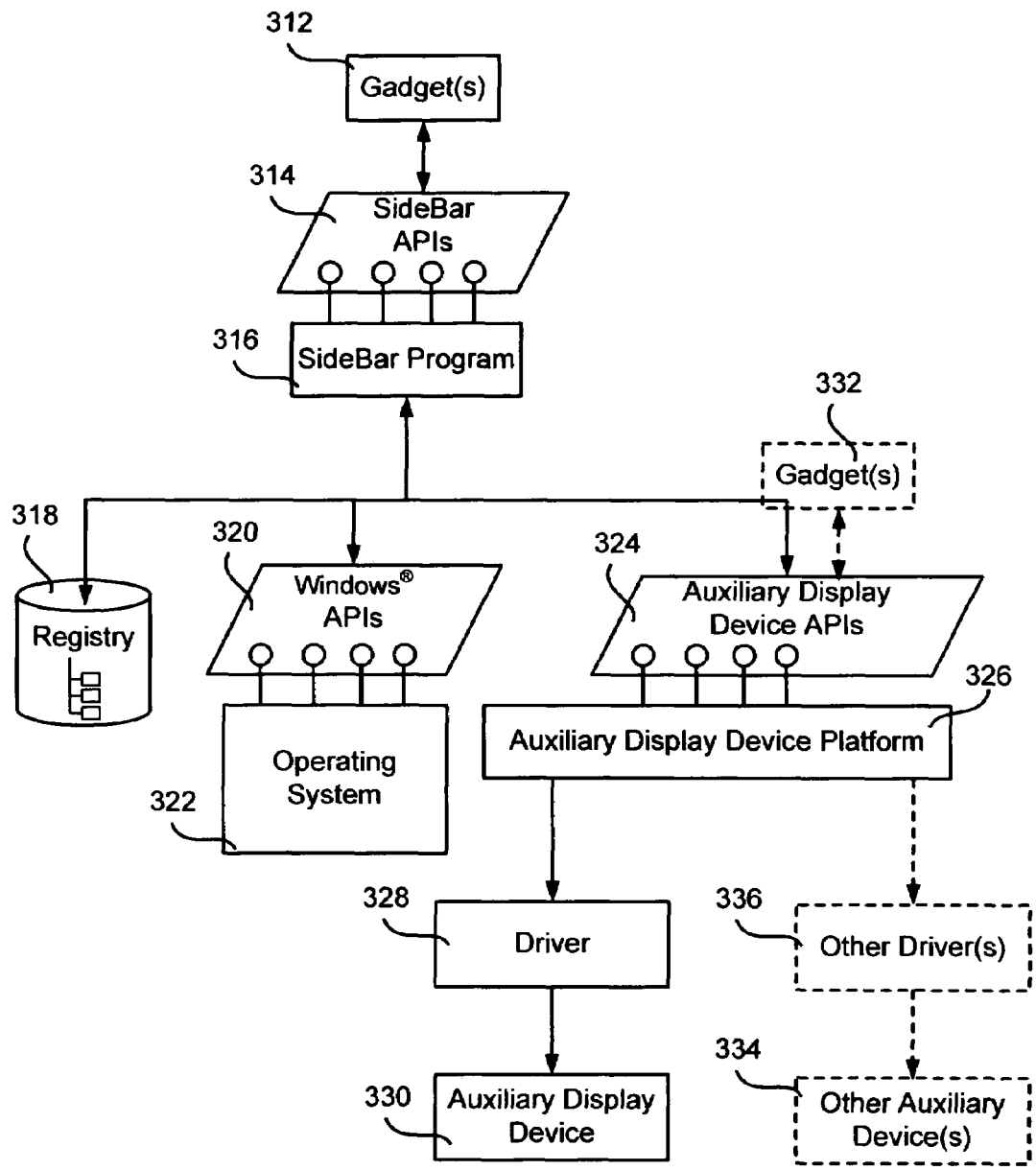
FIG. 3 is a representation of an architecture including interfaces by which a gadget communicates with a sidebar program and the sidebar program communicates with an auxiliary display device platform.

In general, as represented in the example architecture diagram of FIG. 3, one or more gadgets 312 may call exposed sidebar APIs 314 to work with a sidebar program 316. In general, the sidebar program 316 comprises logic and other code that corresponds to the user interface mechanism 202 of FIG. 2. In one implementation, the sidebar program 316 is an application program that allows users to display gadgets on the sidebar itself and on the desktop, and as described herein, on another device such as an auxiliary display.

Among its capabilities, the exemplified sidebar program 316 may write data to a registry 318, call APIs 320 of an operating system 322 (e.g., Windows®), and call auxiliary display APIs 324. Via one or more of these capabilities, the sidebar program 316 integrates with an auxiliary display platform 326 to provide output data, such as gadget-generated data, via a driver 328 to an auxiliary display device 330 (or other display or storage). The auxiliary display platform 326 can also return events generated via the auxiliary display device 330, e.g., including events from the auxiliary display device 330 directed towards an appropriate gadget.

It should be noted that other types of gadgets may call the auxiliary display APIs 326 directly, and are shown here for completeness via the dashed block 332 and accompanying dashed line. However, because the sidebar APIs 314 include a mechanism for gadgets to essentially make API calls through the sidebar program 316 to the auxiliary display APIs 324, gadgets written for the sidebar program 316 also may be used with the auxiliary display platform 326. From a developer's perspective, the additional sidebar APIs 314 make it easier to get a gadget to work with the auxiliary display platform 326 (e.g., compared to writing a gadget 332 directly for the auxiliary display platform). Moreover, sidebar developers may access the auxiliary display platform APIs 324 to develop a single gadget that works on both platforms.

The example technology described herein may include user-level integration for gadget management, as well as facilitate user discovery of the integration. Script friendly APIs may be exposed in the sidebar API set 314, and the auxiliary display platform 326 may be detected from the web, facilitating the deployment of auxiliary display gadgets. For users, gadgets written for the sidebar program 316 may show up in a consistent manner in an auxiliary display control panel or the like, and sidebar gadgets written for the auxiliary display platform 326 may be automatically enabled, e.g., after a first run prompt.

In general, the sidebar program 316 provides logic and APIs 314 that simplify coupling a gadget for output via the auxiliary display platform 326, and also provides benefits such as caching data. For example, the sidebar program 316 handles registration/installation of gadgets via the registry 318, including registering and/or installing auxiliary display-related/auxiliary display-capable gadgets 312 via its APIs 314. Separate gadget registration and installation for the auxiliary display platform are thus not needed.

Figure 4:
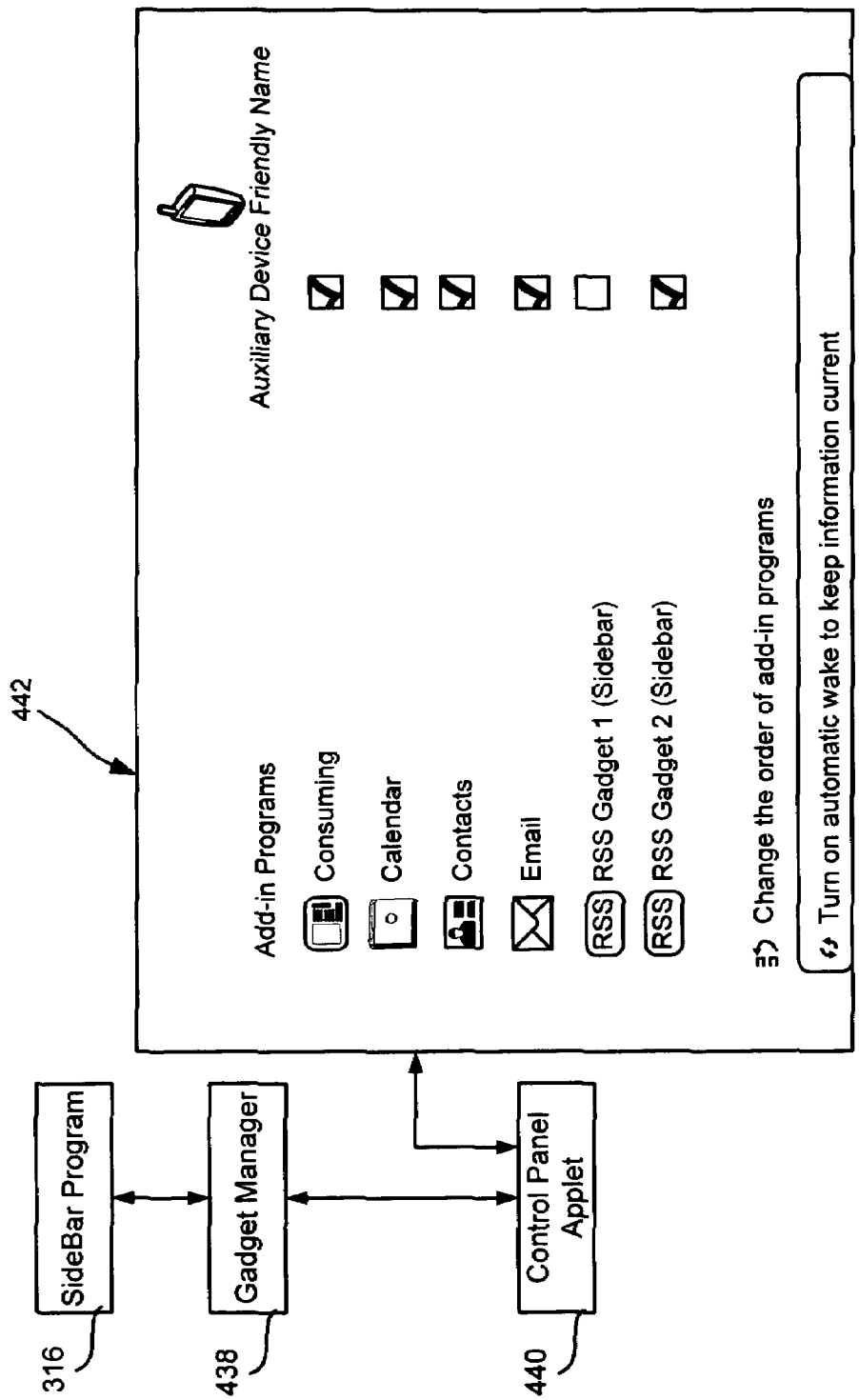
FIG. 4 is a representation of a user interface that allows installed gadgets to be selectively enabled or disabled for use with an auxiliary display device.

Still further, the sidebar program 316 may be used to configure devices to receive gadget-provided and/or other data. The sidebar program 316 may configure a program, e.g., a gadget manager (or picker) 438 (FIG. 4) to run programs on various devices. Via the gadget manager 438 and/or a control panel applet 440, the user can select a gadget to be run on the sidebar program and/or any appropriate device, including the auxiliary display device 330 (and/or another auxiliary device 334, not necessarily a display device, with a suitable driver 336). An example user interface 442 that may help a user manage gadgets is also shown in FIG. 4.

Further note that there may be multiple instances of a gadget, multiple instances of a sidebar, and/or multiple auxiliary display devices and/or other output devices. Any of these instances may output to any one or more of the auxiliary or other devices. Moreover, the gadget's output data for rendering is not limited to being shown in the sidebar area 202 (FIG. 2) and/or the auxiliary display device 330, (each may show data at the same time), but also can be sent to other, multiple locations. Examples include another computer system, a terminal (e.g., remote), a browser location (e.g., for accessing remotely), transient hardware devices including other auxiliary displays such as the device 334, dedicated remote devices such as a cell phone, a cache for later output/playback, projection mechanisms including heads-up displays such as with eyeglasses or windshields, any SPOT (Smart Personal Object Technology) device, and so forth. Essentially via the integration, the output can be sent anywhere.

Other aspects that may be provided include a 'write once, run anywhere' concept for gadgets, e.g., capable of calling both auxiliary display or sidebar APIs 324 and 314, respectively, and a common gadget manager, such as the above-described gadget manager 438 by which gadgets may be managed, including for example, starting and stopping them based on the presence of output devices. For example, the gadget manager 438 may show sidebar and auxiliary display gadgets together, e.g., by which a user has all gadgets listed and accessible in one location. A common install/uninstall mechanism for gadgets may be provided, e.g., supplying a similar and understandable user experience to get gadgets on and off a machine. Common settings and settings integration for gadgets is another aspect. Still another aspect is allowing auxiliary display gadgets to run seamlessly on the sidebar program 316 through auxiliary display emulation, e.g., in which the sidebar area 202 (FIG. 2) includes a sub-region (and/or the sidebar program 316 opens a window on the main display area 204) that displays content on the system's display screen as if it was an auxiliary display device.

With respect to sidebar integration and a sidebar gadget with auxiliary display functionality, auxiliary display features may be activated when an auxiliary display device platform 326 is available on the given machine and at least one auxiliary display device was previously installed (although not necessarily currently actively coupled). A sidebar gadget may be installed in typical ways as described above for a gadget in general, e.g., by double clicking a gadget file or opening it on download; a dialog or other warning prompt may appear before downloading and/or installing a sidebar gadget.

When loaded, the gadget may be added to the gadget manager program 438, e.g., by persisting data about that gadget in a data store accessible to the gadget manager program 438, such as in the registry 318. Note that there can be multiple instances of the same gadget running on the computer system, e.g., on its desktop. In such a situation, an instance of the auxiliary display gadget may be created per instance of the sidebar gadget.

Turning to examples regarding operation of the components exemplified in FIGS. 3 and 4, for new gadget notification, the sidebar program 316 may create gadget entries in the registry 318, including a GadgetID, comprising a unique per gadget instance ID determined by the sidebar program 316, and a FriendlyName, e.g., a typically human-recognizable gadget name specified in a manifest accompanying the gadget code, with the name capable of being overwritten by an API call from the gadget. The entries also may include an icon (or path thereto) specified in the manifest, and an endpointID corresponding to a predefined simple content format endpoint or another format used in communication with auxiliary display devices. A gadget manager may be called to initiate new gadget notifications to the user.

In one example implementation, a gadget contains the following files:

| | |
|---|---|
| Gadget Manifest | An XML file defining the gadget properties, including name, icon and description |
| HTML file | Defines the core code for the gadget |
| HTML settings file | Exposes gadget settings for the user to change |
| Images, Script and Style Sheets | For use in the HTML |
| Icon | For use in the gadget manager |

With respect to a global setting for automatic enabling of auxiliary display device-related gadgets, the user may be given the option to automatically enable gadgets on an auxiliary display device, e.g., to show this option only when they have configured an auxiliary display device 330 (even if not currently active) to work with the host computer system on which the sidebar program 316 and auxiliary display device platform 326 are running. The user may be notified via a dialog or the like showing the friendly name/icon when a new gadget is installed, and a checkbox or the like (e.g., the checkbox 550 in FIG. 5) that links to a control panel applet 440

(FIG. 4) or the like may be provided to allow the user to manually enable the gadget for auxiliary display device operation.

After installation, the user may activate or deactivate programs including gadgets via the control panel applet 440 or the like. FIG. 4 shows programs including gadgets in an example control panel applet's user interface 442 for a given auxiliary display device, with each program having a checkbox that can be checked (activate program) or unchecked (deactivate program) on this particular device.

Note that in one implementation, to close/disable a sidebar accessible gadget, the sidebar gadget needs to be running to provide any value to the auxiliary display device. Without the sidebar gadget running, there can be no information sent to auxiliary display devices, and if the user never runs the gadget on the sidebar, enabling the gadget has no meaning. For example, the sidebar gadget may only be shown in the auxiliary display device's control panel applet (e.g., 442 of FIG. 4) when the sidebar gadget is running.

In one example user model, a sidebar gadget is somewhat different from a regular gadget. For example, the lifetime of the gadget is controlled by the sidebar program 316 (FIG. 3). Each instance of the gadget that is running is similar to a gadget install/uninstall. The user may be informed that this instance is associated with an auxiliary display gadget, so as to make it clear why this gadget appears or disappears from the auxiliary display device. The user enables and disables such a sidebar gadget on an auxiliary display device as normal, but this gadget disappears from the device when the user closes the corresponding sidebar gadget.

Multiple instances of a single sidebar gadget can run concurrently. Each gadget instance can have different settings so that each provides new information to the user, e.g., for different RSS web feeds, to monitor different portfolios, to display clocks for different time zones, and so forth. This somewhat contrasts with the concept of having one gadget show all the required information by allowing navigation within the gadget.

As described above, a gadget's settings in sidebar may be based on a manifest, e.g., (in a markup format):

<sideshow>
</sideShow>

To expose a simplified set of APIs, with primary support for offline and simple content format gadgets, a mechanism (e.g., in the sidebar program 316 and/or gadget manager 438) comprising logic and related steps may be performed when an auxiliary display device-enabled sidebar gadget starts up. In general, the mechanism checks if the host computer system is auxiliary display device-enabled. If it is, the mechanism installs the gadget with the platform, e.g., by writing the registry keys under HKCU\Software\Microsoft\SideShow\Gadgets\{GADGET_ID} . . . into the registry 318.

If the host computer system is auxiliary display device-enabled and the platform supports auxiliary display devices (e.g., an appropriate Windows® operating system version is running and at least one auxiliary display device has been installed), then a session object is created, and a register content function is called. This function registers the gadget using the gadget's unique GUID and the endpoint specified in the manifest (in which a predefined simple content format is the default endpoint).

The register content function returns an interface, e.g., an ISideShowContentManager interface, which is stored. Through a method of this interface, auxiliary display device-provided events are subscribed to, e.g., via an ISideShowContentManager.SetEventSink method.

The mechanism also creates a global content cache for storing content objects, including objects added by the gadget. The objects are removed from the cache when removed by the gadget. Larger objects/images may be dealt with as necessary, e.g., by caching a path to such objects and images.

In general, the cached objects are used to respond to events from devices (e.g., ContentMissing events) that indicate that some content is needed. Upon such events, the appropriate object is sent from the cache to the device. In the event the cache does not contain the corresponding object being requested, the process faults out, assuming that content needs to be in the cache. To update a newly added device, the mechanism also responds to any device added (DeviceAdded) events, and re-adds the content to update the new device.

When an auxiliary display device-enabled sidebar gadget is closed or crashes, the SideShow™ registration entries under HKCU\Software\Microsoft\SideShow\Gadgets\{GADGET_ID}\ . . . are removed, and the user may be prompted, e.g., to inform the user that the auxiliary display device gadget is being removed.

The following sets forth some example APIs that are used to implement the above example logic and steps:

bool Windows.SideShow.Enabled( )
    Allows developers to decide if they need to perform any auxiliary display device-related operations for the gadget
    Return Value:
    true—If appropriate operating system version and at least one device installed
    false—otherwise
    Underlying work may check the operating system version, then call into SetupDi APIs to check if any auxiliary display devices are installed.

void Windows.SideShow.AddText(int id, string text) Add any Unicode or (other) string to auxiliary display devices with the specified id.
    Possible limitations may be that there is no content differentiation for devices. Content is expected to conform to the endpoint specified in the gadget manifest.
    Underlying work may create an object that implements ISideShowContent. Set the Content for this object to the UTF8 encoded string and the specified id. Call ContentManager.Add with this object. Store this object in a global content cache for future use when content missing events are received.
    Example: Windows.SideShow.AddText (0, "Test Glance Content") Windows.SideShow.AddText (1, "<body><menu><item target='1'>Test Menu Item</item></menu></body>")

void Windows.SideShow.AddImage(int id, string image) Adds any Image file (or possibly a reference handle) to SideShow™ devices with the specified id.
    Possible limitations may be that there is no content differentiation for devices. Content is expected to conform to the endpoint specified in the gadget manifest.
    Underlying work may create an object that implements ISideShowContent. Set the content for this object to the raw bytes of the image and set the specified id. Call ContentManager.Add with this object. Store this object in a global content cache for future use when content missing events are received.
    Example: Windows.SideShow.AddImage (10, "http://hp.msn.com/global/c/lg/msft94.gif") Windows.SideShow.AddImage (27, "background.jpg")

void Windows.SideShow.Remove(int id) Removes content specified by the id
    Possible Limitations: None Underlying work may include calling Remove on ContentManager, and removing the object from the global content cache.

Example: Windows.SideShow.Remove (10)

void Windows.SideShow.RemoveAll( ) Removes all content from devices

Possible Limitations: None

Underlying work may includes calling RemoveAll on ContentManager, and clearing objects from the global content cache Example: Windows.SideShow.RemoveAll( )

event Windows.SideShow.ApplicationEvent(int eventId, variant eventData)

Receives navigation and other events from device void Windows.SideShow.ShowNotification(string message, string title, string image, DateTime expirationTime) void Windows.SideShow.RevokeAllNotifications( )

In one implementation, example requirements for the auxiliary display device include allowing the sidebar to perform required tasks, providing the ability to programmatically enable gadgets from the sidebar component, providing an API that contains one method call to enable a single gadget on all devices that support the gadget's endpoint, and providing an API that contains one method call to disable a single gadget on all devices.

In one implementation, example requirements for the control panel applet include reading icons from a sidebar gadget, (potentially from an .ico file), and reading a registry key to mark a sidebar gadget for auxiliary display device usage so that it can be separately called out in the control panel applet's user interface.

In one implementation, example requirements for the sidebar gadget include a sidebar gadget manifest, e.g., having an icon based on 16, 32, or 48 pixels, in which the manifest indicates that the sidebar gadget has auxiliary display device capabilities. The manifest specifies any endpoints that are supported (the default simple content format need not be specified, with only one endpoint supported for a sidebar gadget).

The sidebar exposes a subset of APIs, which may include a scriptable version of APIS, and which may be simplified relative to its complete API set (e.g., provided in C++/COM). To support multiple instances, an API to distinguish among friendly names is provided.

Figure 6:
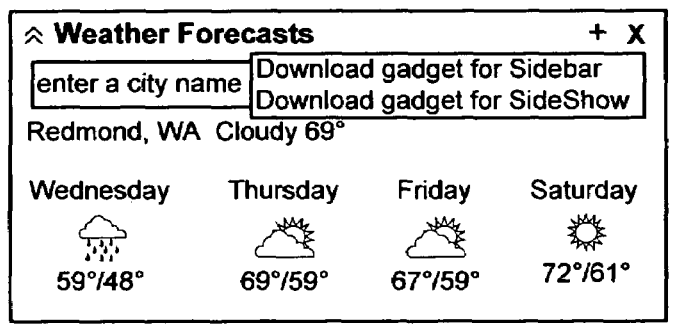
FIG. 6 is a representation of a user interface that allows a gadget to be downloaded for use with a sidebar program, with an auxiliary display device, or both.

Gadgets may also be installed from special websites known as live.com or Start.com. With respect to live.com or Start.com Integration, one example interaction scenario enables live.com or Start.com to expose a Windows SideShow™ (auxiliary display device) version of any gadget that runs on live.com or Start.com. For example, if a weather website created a Windows SideShow™ gadget, that site may expose the Windows SideShow™ gadget through their live.com or start.com gadget. To this end, live.com or Start.com may detect if a personal computer has the auxiliary display (Windows® SideShow™) platform and/or the sidebar platform. If the auxiliary display platform is present, then the user can download the gadget, such as exemplified via the representation of FIG. 6.

Thus, to provide the information as to whether the auxiliary display device is present, a method may be called, e.g.:

bool IsSideShowEnabled( )

Return:

True if the computer system has at least one auxiliary display device installed

False if the computer system has never had a auxiliary display device installed

API not available down level

Figure 5:
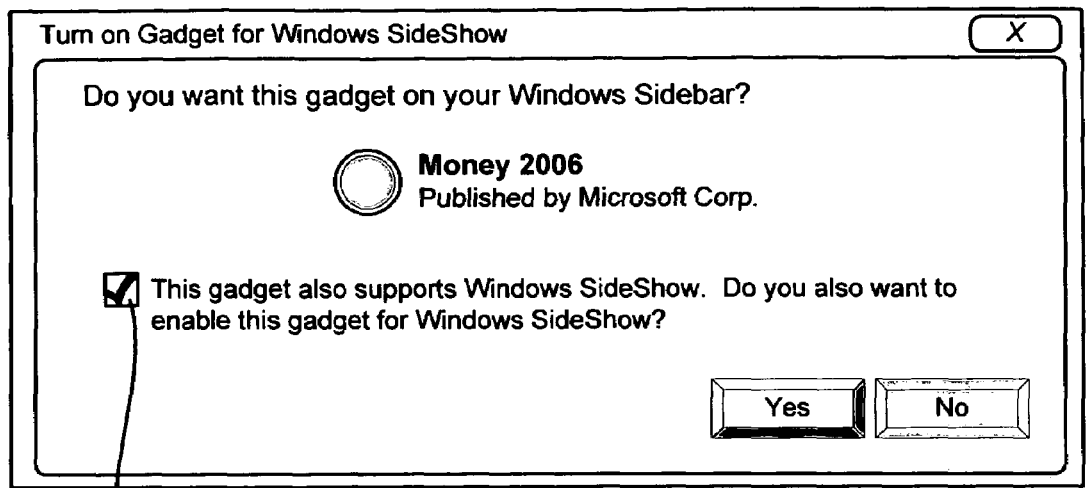
FIG. 5 is a representation of a user interface that allows a gadget to be further enabled for use with an auxiliary display device upon enabling the gadget for use with a sidebar program.

An optional prompt may be provided to a user before allowing a gadget to run on an auxiliary display device, which may occur when the gadget is first installed or when the first auxiliary display device is enabled. In one implementation, the installation is enabled by default such that when the user enables a gadget for the sidebar, the user also enables it on each auxiliary display device. FIG. 5 shows an example of one such prompt. In this example implementation, if the user selects Yes (e.g., via the buttons) and the Checkbox 550 is enabled, instances of this gadget are installed as new gadgets and enabled on all devices (default is checked). If the user selects Yes and the Checkbox 550 is disabled, instances of this gadget are installed as new auxiliary display device gadgets but disabled on all devices. If the user selects No, (independent of any Checkbox 550 state), the gadget is not installed and it does not show on the control panel applet or on the sidebar.

As described above with reference to FIG. 3, the auxiliary display device APIs 324 facilitate integration into the sidebar program 316, whereby it is straightforward to add auxiliary display device functionality to an existing sidebar gadget. The example code snippet below demonstrates this, with the result comprising an auxiliary display device gadget that cycles through pictures along with the sidebar gadget:

```
// This function is called every time a picture updates with
// pic.next=function (delta)
function LoadSideShowData ( )
{
    // Get the local file name from the picture uri
    var filename = pic.src.substring(pic.src.indexOf(":") +
4,pic.src.length);
    // Glance text - nothing useful, just number of pictures
    gadget.SideShow.AddText (0, pics.length + " pictures");
    // Add content to show a single image
    gadget.SideShow.AddText (1, "<body><content id='1'><img
fit='screen' align='c' id='2' /></content></body>");
    // Add image
    gadget.SideShow.AddImage (2, filename);
}
```

For developers, it is relatively straightforward to make a Windows® SideShow™ gadget from a sidebar gadget, e.g., by obtaining the latest version of the sidebar, opening a gadget (e.g., under a gadgets folder), and editing the main html/js files under the en-US or the root folder to add SideShow™ functionality. Example APIs include:

gadget.SideShow.SetFriendlyName (string name)—to set the gadget name, should be the first call gadget.SideShow.AddText (int contented, string content)—to add any content—most like formatted using simple content format to the device gadget.SideShow.AddImage (int contented, string filename)—to add an image, use the full path to the file gadget.SideShow.Remove (int id)—remove content gadget.SideShow.RemoveAll( )—remove all content event Windows.SideShow.ApplicationEvent(int eventid, variant eventData)—for the advanced event user To run the sidebar gadget on Windows® SideShow™-compatible devices, a balloon or the like may show up indicating that the gadget is available for Windows® SideShow™. By clicking the balloon and enabling the gadget for Windows® SideShow™ by checking the appropriate box, the gadget may be navigated to on the auxiliary display device by the user. Gadgets pre-installed with sidebar are essentially unlimited.

Figure 7:
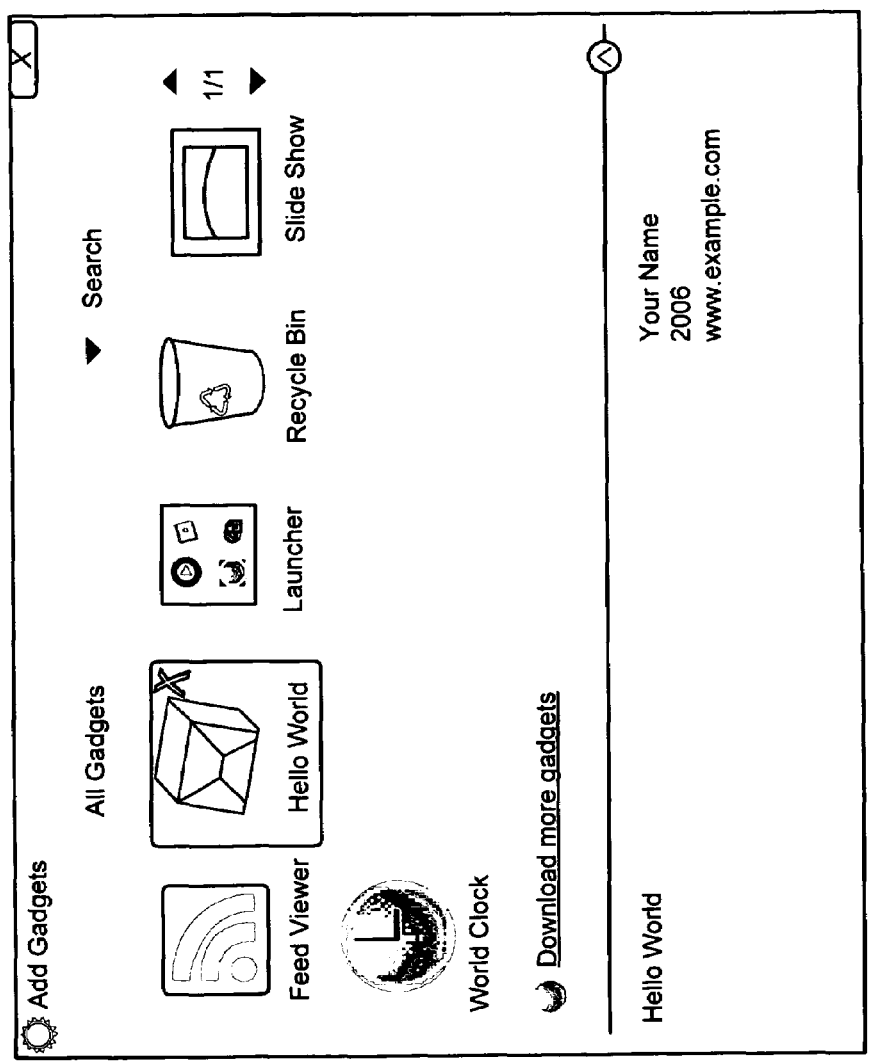
FIG. 7 is a representation of a gadget gallery that allows users to interface with gadgets.

The sidebar may also provide a mechanism by which users manage gadgets through a gadget gallery. FIG. 7 shows a gadget gallery with various example gadgets available for selection and use. One type of gadget shown is a feed viewer gadget that takes advantage of a browser's RSS platform. Such a gadget allows the user to select feeds already configured using the browser (e.g., Internet Explorer 7) and displays items from those feeds. Other gadgets include a launcher gadget that allows users to place shortcuts to applications and files on the launcher gadget, e.g., by dragging the item to the gadget. A world clock gadget displays the time and allows the user to configure a time zone; if more than one world clock gadget is open, it is convenient to keep track of the time in multiple locations. A recycle bin gadget allows users to drag items to the gadget to move them to the operating system's recycle bin. The exemplified recycle bin gadget may provide at-a-glance information about the contents of the recycle bin, along with a mechanism to empty those contents. Also represented in FIG. 7 is a slide show gadget that cycles through photos, e.g., in a user-selected folder, whereby users may personalize their computing experience from their favorite photographs.

Figure 8:
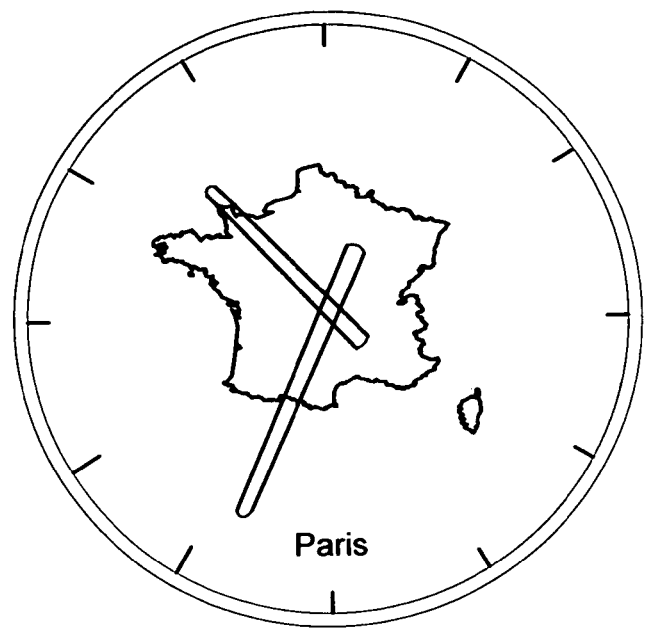
FIGS. 8 and 9 are representations of a single gadget having different instances with different settings.
Figure 9:

Each gadget has the ability to be staffed multiple times by the user, each with different settings. FIGS. 8 and 9 exemplify one gadget running with two settings corresponding to different clocks for different time zones. Another example is to have a slideshow viewer show different picture collections. This is possible because the sidebar APIs provide methods for developers to store settings, and automatically associate settings with the correct instance of each gadget. The gadgets may also run automatically and with the same settings when the user logs out or restarts the computer. Moreover, the gadgets may be displayed in different locations, e.g., on the sidebar and on the auxiliary display device, possibly with at least some settings automatically selected depending where the gadget is being displayed, and/or on what type of auxiliary display device.

Gadgets may have the ability to respond to user interaction, such as by clicking on buttons within the displayed representation of the gadget, by clicking on images or text, or by moving the gadget around the screen. Developers may respond to both of these events through script by changing the gadget's appearance as necessary.

In one example implementation, each gadget is developed using HTML and script. A gadget also has access to extra information about itself and the operating system when the HTML is run as a gadget. This allows a gadget to interact with operating system/file system files and folders, such as to show images from the user's pictures folder, or display information about a wireless connection. Displaying settings dialogs and storing those settings is also possible by using script. Very complex and rich gadgets may be developed using only script, e.g., without using other binary objects.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions stored thereon, which when executed perform steps for ensuring that gadgets designed for use with a sidebar program are compatible with one or more of a plurality of auxiliary displays, such that gadgets designed for use with the sidebar program are automatically compatible with the auxiliary display, the steps comprising:

receiving a request to install a gadget on a sidebar program of a host computer system, the sidebar program being configured to run one or more installed gadgets, the gadgets being written in a format compatible with the sidebar program, and being configured to communicate with the sidebar program using a first interface;

determining that one or more auxiliary display devices are communicatively coupled to the host computer system;

installing the gadget on the sidebar of the host computer system such that the gadget is configured to output display data for display on both the sidebar program using the first interface and on at least one communicatively coupled auxiliary display device in a second, different format using a second, different interface that allows gadgets written in a first format compatible with the sidebar program to be displayed on the auxiliary display device while maintaining substantially the same display appearance in both the first format on the sidebar and in the second format on the auxiliary display; and receive an indication from a user that a first instance of the installed gadget is to be opened in the sidebar program of the host computer system and that a second instance of the installed gadget is to be opened on the auxiliary display device;

displaying the first instance of the gadget in the sidebar program of the host computer system using the first interface in the first format compatible with the sidebar program; and displaying the second instance of the gadget on the auxiliary display using the second interface in the second format associated with the auxiliary display.

2. The computer-readable medium of claim 1 wherein receiving the request to install the gadget comprises receiving a request associated with an application program.

3. The computer-readable medium of claim 1 wherein receiving the request to install the gadget comprises receiving a request associated with downloadable content.

4. The computer-readable medium of claim 1 wherein receiving the request to install the gadget comprises receiving a request associated with user selection of a file corresponding to the gadget.

5. The computer-readable medium of claim 1 wherein installing the gadget comprises writing information to a system registry.

6. The computer-readable medium of claim 1 wherein installing the gadget comprises providing a sidebar program API set through which the gadget communicates with a sidebar program that installs the gadget.

7. The computer-readable medium of claim 6 further wherein the sidebar program communicates with the auxiliary display device platform via an auxiliary display device API set.

8. The computer-readable medium of claim 6 having further computer-executable instructions comprising, executing the gadget, wherein the sidebar program communicates with an auxiliary display device platform such that data received from the gadget via the sidebar program API set is output to the auxiliary display device.

9. The computer-readable medium of claim 6 having further computer-executable instructions comprising, executing the gadget, wherein the sidebar program communicates with an auxiliary display device platform such that an event received from the auxiliary display device is returned to the gadget via the sidebar program API set.

10. The computer program product of claim 1, wherein at least one of the auxiliary display devices returns one or more events generated by the auxiliary display device.

11. The computer program product of claim 1, wherein the gadget includes at least one feature that is made available to the auxiliary display device when the auxiliary display device is detected.

12. The computer program product of claim 1, wherein a subset of gadgets installed in the sidebar program are displayed on the auxiliary display device, the subset including those gadgets that are currently running in the sidebar program.

13. The computer program product of claim 1, wherein multiple instances of a single gadget are running simultaneously in the sidebar program and on the auxiliary display device.

14. The computer program product of claim 13, wherein at least one of the instances running on the auxiliary display device is running using settings specific to gadgets run on the auxiliary display device.

15. The computer program product of claim 1, further comprising adding auxiliary display device functionality to an existing gadget installed in the sidebar program.

16. The computer program product of claim 1, wherein the gadget is displayed on the auxiliary display device while the host computer is in standby mode.

17. The computer program product of claim 1, wherein the gadget is displayed on the auxiliary display device while the host computer is turned off.

18. In a computing environment, a system comprising:
one or more processors;
system memory;
  a receiving module for receiving a request to install a gadget on a sidebar program of a host computer system, the sidebar program being configured to run one or more installed gadgets, the gadgets being written in a format compatible with the sidebar program, and being configured to communicate with the sidebar program using a first interface;
  a determining module for determining that one or more auxiliary display devices are communicatively coupled to the host computer system;
  an installing module for installing the gadget on the sidebar of the host computer system such that the gadget is configured to output display data for display on both the sidebar program using the first interface and on at least one communicatively coupled auxiliary display device in a second, different format using a second, different interface that allows gadgets written in a first format compatible with the sidebar program to be displayed on the auxiliary display device while maintaining substantially the same display appearance in both the first format on the sidebar and in the second format on the auxiliary display;
  a receiving module of receiving an indication from a user that a first instance of the installed gadget is to be opened in the sidebar program of the host computer system and that a second instance of the installed gadget is to be opened on the auxiliary display device; and
  a display for displaying the first instance of the gadget in the sidebar program of the host computer system using the first interface in the first format compatible with the sidebar program and displaying the second instance of the gadget on the auxiliary display using the second interface in the second format associated with the auxiliary display.

19. In a computing environment having a computer system and a main computer display, a method comprising:
  receiving a request to install a gadget on a sidebar program of a host computer system, the sidebar program being configured to run one or more installed gadgets, the gadgets being written in a format compatible with the sidebar program, and being configured to communicate with the sidebar program using a first interface;
  determining that one or more auxiliary display devices are communicatively coupled to the host computer system;
  installing the gadget on the sidebar of the host computer system such that the gadget is configured to output display data for display on both the sidebar program using the first interface and on at least one communicatively coupled auxiliary display device in a second, different format using a second, different interface that allows gadgets written in a first format compatible with the sidebar program to be displayed on the auxiliary display device while maintaining substantially the same display appearance in both the first format on the sidebar and in the second format on the auxiliary display;
  receive an indication from a user that a first instance of the installed gadget is to be opened in the sidebar program of the host computer system and that a second instance of the installed gadget is to be opened on the auxiliary display device:
  displaying the first instance of the gadget in the sidebar program of the host computer system using the first interface in the first format compatible with the sidebar program; and
  displaying the-second instance of the gadget on the auxiliary display using the second interface in the second format associated with the auxiliary display.

20. The method of claim 19 wherein the application program comprises a gadget downloaded from a website, and further comprising, detecting that the computer system has the auxiliary display device platform, and enabling the gadget to output data to the auxiliary display device.

* * * * *